(12) United States Patent
Kumar et al.

(10) Patent No.: US 11,157,130 B2
(45) Date of Patent: Oct. 26, 2021

(54) CURSOR-BASED RESIZING FOR COPIED IMAGE PORTIONS

(71) Applicant: Adobe Inc., San Jose, CA (US)

(72) Inventors: Nishant Kumar, Siliguri (IN); Nitesh Yadav, New Delhi (IN)

(73) Assignee: ADOBE INC., San Jose, CA (US)

( * ) Notice: Subject to any disclaimer, the term of this patent is extended or adjusted under 35 U.S.C. 154(b) by 103 days.

(21) Appl. No.: 15/905,488

(22) Filed: Feb. 26, 2018

(65) Prior Publication Data

US 2019/0265860 A1 Aug. 29, 2019

(51) Int. Cl.
*G06F 3/048* (2013.01)
*G06F 3/0481* (2013.01)
*G06T 11/60* (2006.01)
*G06F 3/0484* (2013.01)

(52) U.S. Cl.
CPC ...... *G06F 3/04812* (2013.01); *G06F 3/04845* (2013.01); *G06T 11/60* (2013.01); *G06T 2200/24* (2013.01)

(58) Field of Classification Search
CPC ..... G06F 3/0481–0489; G06F 3/04842; G06F 3/04817; G06F 3/04815; G06F 3/017; G06F 3/04812; G06F 3/04845; G06T 11/60; G06T 2200/24
USPC .................................................. 345/156–157
See application file for complete search history.

(56) References Cited

U.S. PATENT DOCUMENTS

| | | | | |
|---|---|---|---|---|
| 5,583,981 A | * | 12/1996 | Pleyer | G06F 3/0481 715/201 |
| 6,067,085 A | * | 5/2000 | Modh | G06F 3/04812 715/711 |
| 6,809,720 B2 | * | 10/2004 | Malamud | G06F 3/0481 345/157 |
| 7,587,680 B2 | * | 9/2009 | Wada | G06F 16/10 715/804 |
| 7,596,766 B1 | * | 9/2009 | Sharma | G06F 3/04895 715/854 |
| 7,694,234 B2 | * | 4/2010 | Fleisher | G06F 3/0481 715/801 |

(Continued)

OTHER PUBLICATIONS

Adobe Photoshop, "Clone", downloaded from https://helpx.adobe.com/photoshop/key-concepts/clone.html, Aug. 22, 2016, 3 pages.

(Continued)

*Primary Examiner* — Steven B Theriault
(74) *Attorney, Agent, or Firm* — F. Chau & Associates, LLC (57) ABSTRACT

A copied image portion, such as an extracted image object, may be rendered together with (e.g., within) a cursor control element. Simply by resizing the cursor control element, the copied, rendered image portion may also be resized accordingly. For example, as the cursor control element is enlarged or reduced, the copied, rendered image portion within the cursor control element is also enlarged or reduced. In this way, a user may easily preview and designate a desired size of the copied, rendered image portion, and then simply place the cursor control element at a desired destination location (in the same or different image) to complete the desired pasting operation, and with a desired size of the pasted image portion.

11 Claims, 5 Drawing Sheets

(56) References Cited

U.S. PATENT DOCUMENTS

| | | | | |
|---|---|---|---|---|
| 7,853,888 B1* | 12/2010 | Dhawan | G06F 3/0486 | 715/770 |
| 8,487,963 B1* | 7/2013 | Harris | G06T 11/00 | 345/619 |
| 8,817,053 B2* | 8/2014 | Robert | G06F 9/445 | 345/660 |
| 9,235,314 B2* | 1/2016 | Stringer | G06F 3/04812 | |
| 9,535,599 B2* | 1/2017 | Kim | G06F 3/0416 | |
| 9,942,469 B2* | 4/2018 | Lee | H04L 51/32 | |
| 10,078,414 B2* | 9/2018 | Louch | G06F 3/04812 | |
| 10,101,891 B1* | 10/2018 | Kulewski | G06F 3/04845 | |
| 10,318,034 B1* | 6/2019 | Hauenstein | G06F 3/04842 | |
| 2002/0011990 A1* | 1/2002 | Anwar | G06F 3/04847 | 345/173 |
| 2004/0101206 A1* | 5/2004 | Morimoto | G06F 3/0481 | 382/254 |
| 2004/0205514 A1* | 10/2004 | Sommerer | G06F 40/137 | 715/205 |
| 2005/0168488 A1* | 8/2005 | Montague | G06F 3/04845 | 345/659 |
| 2007/0033542 A1* | 2/2007 | Winser | G06F 3/0481 | 715/788 |
| 2007/0198942 A1* | 8/2007 | Morris | G06F 3/04812 | 715/767 |
| 2008/0022229 A1* | 1/2008 | Bhumkar | G06F 16/9038 | 715/838 |
| 2008/0256476 A1* | 10/2008 | Seo | G03G 15/5016 | 715/772 |
| 2009/0007012 A1* | 1/2009 | Mandic | G06F 3/0482 | 715/810 |
| 2009/0119597 A1* | 5/2009 | Vaughan | G06F 13/80 | 715/732 |
| 2009/0128486 A1* | 5/2009 | Nijlunsing | G06F 3/04847 | 345/157 |
| 2009/0265632 A1* | 10/2009 | Russ | G06F 16/4393 | 715/716 |
| 2011/0102336 A1* | 5/2011 | Seok | G06F 3/04886 | 345/173 |
| 2011/0109646 A1* | 5/2011 | Ahmann | G06T 11/001 | 345/619 |
| 2011/0320964 A1* | 12/2011 | Gambhir | G06F 3/04817 | 715/756 |
| 2012/0084688 A1* | 4/2012 | Robert | G06F 3/04817 | 715/769 |
| 2013/0067373 A1* | 3/2013 | Weir | G06F 3/04842 | 715/769 |
| 2013/0067380 A1* | 3/2013 | Pettigrew | G06T 7/12 | 715/771 |
| 2013/0097543 A1* | 4/2013 | Su | G06F 3/04845 | 715/770 |
| 2013/0127915 A1* | 5/2013 | Gilra | G06T 3/0012 | 345/660 |
| 2013/0139087 A1* | 5/2013 | Eylon | G06F 40/166 | 715/770 |
| 2013/0311920 A1* | 11/2013 | Koo | G06F 3/04883 | 715/765 |
| 2014/0009395 A1* | 1/2014 | Ku | G06F 3/017 | 345/157 |
| 2014/0059458 A1* | 2/2014 | Levien | G06F 3/04842 | 715/765 |
| 2014/0108929 A1* | 4/2014 | Garmark | H04N 21/8549 | 715/716 |
| 2014/0129992 A1* | 5/2014 | Berger | G06T 11/60 | 715/859 |
| 2014/0253470 A1* | 9/2014 | Havilio | G06F 3/0412 | 345/173 |
| 2015/0012862 A1* | 1/2015 | Ikeda | G06F 3/0485 | 715/770 |
| 2015/0067563 A1* | 3/2015 | Bernstein | G06F 3/03547 | 715/769 |
| 2016/0004401 A1* | 1/2016 | McCommons | G06F 3/0485 | 715/723 |
| 2016/0266763 A1* | 9/2016 | Gupta | G06F 3/04845 | |
| 2016/0357415 A1* | 12/2016 | Bovet | G06F 3/0488 | |
| 2017/0017370 A1* | 1/2017 | Wang | G06F 3/0486 | |
| 2017/0075544 A1* | 3/2017 | Price | G06T 7/11 | |
| 2017/0103557 A1* | 4/2017 | Kumar | G06F 3/04812 | |
| 2017/0220230 A1* | 8/2017 | Price | G06T 11/001 | |
| 2018/0203596 A1* | 7/2018 | Dhaliwal | G06F 3/04817 | |
| 2018/0260984 A1* | 9/2018 | Severenuk | G06F 3/016 | |
| 2019/0163343 A1* | 5/2019 | Ligameri | G06F 1/1641 | |

OTHER PUBLICATIONS

Redmon, Joseph, et al., "You Only Look Once: Unified, Real-Time Object Detection", Proceedings of the IEEE conference on computer vision and pattern recognition, 2016, 10 pages.

* cited by examiner

_CURSOR-BASED RESIZING FOR COPIED IMAGE PORTIONS_

TECHNICAL FIELD

This description relates to image editing software for digital images.

BACKGROUND

Digital image editing refers generally to the use of computer software and associated hardware to access one or more digital image files, and perform modifications on the image(s) of the digital image file(s). In many cases, digital image editing techniques are designed to incorporate a modification within an original image, to produce a modified image.

For example, it is often desirable to extract and copy an image from a source location (e.g., to identify an image portion from within an image), and then paste the extracted, copied image portion to a target or destination location. For example, the copied image portion may be pasted to a different location within the image, or to a destination location within a different image.

In many cases, the copied image portion has an original size, and it is desirable to paste the copied image portion with a size different than the original size. For example, when copying/pasting between different image files, the different images may have different sizes, so that an appropriate size of the image portion within the source image is inappropriate or undesirable within the destination image.

Conventional approaches, however, do not provide sufficiently fast or convenient resizing techniques for copying/pasting image portions. For example, conventional techniques may require an undesirably large number of keystrokes or other operations on the part of a user. In other examples, conventional techniques may require the user to estimate a desired size of a copied/pasted image portion, and then re-execute the copying/pasting operations when such estimates are incorrect.

SUMMARY

According to one general aspect, a computer program product is tangibly embodied on a non-transitory computer-readable storage medium and includes instructions that, when executed by at least one computing device, are configured to cause the at least one computing device to receive a request to copy an image portion of a digital image rendered in a graphical user interface, the copied image portion having a first image portion size, and render a preview of the copied image portion in conjunction with at least one cursor control element of a cursor. The instructions, when executed, are further configured to cause the at least one computing device to move the preview, in response to a movement of the cursor, to a destination location, re-size the preview, in response to a size change event of the at least one cursor control element, to obtain a re-sized preview; and paste the copied image portion at the destination location as a pasted image portion, and having a second image portion size determined from the re-sized preview.

According to another general aspect, a computer-implemented method includes copying an image portion of a digital image rendered in a graphical user interface, the copied image portion having a first image portion size, and rendering a preview of the copied image portion in conjunction with at least one cursor control element of a cursor. The method further includes moving the preview to a destination location specified by the cursor, re-sizing the preview, in response to a size change event of the at least one cursor control element, to obtain a re-sized preview, and pasting the copied image portion at the destination location as a pasted image portion, and having a second image portion size determined from the re-sized preview.

According to another general aspect, a computer program product is tangibly embodied on a non-transitory computer-readable storage medium and includes instructions that, when executed by at least one computing device, are configured to cause the at least one computing device to copy an image portion of a digital image, and generate a preview of the copied image portion that is overlaid on the digital image and included within at least one cursor control element. The instructions, when executed, are further configured to cause the at least one computing device to receive a size change request for the preview, and change a size of the preview, based on the size change request, to thereby obtain a re-sized preview. The instructions, when executed, are further configured to cause the at least one computing device to move the at least one cursor control element to a destination location, and paste the copied image portion at the destination location with a size determined from the re-sized preview.

The details of one or more implementations are set forth in the accompanying drawings and the description below. Other features will be apparent from the description and drawings, and from the claims.

DETAILED DESCRIPTION

Digital image editing is a technical field that enables both professional and amateur users to modify and manipulate digital images. This document describes systems and techniques that provide for digital image editing using image editing software. Such systems and techniques overcome technical challenges of previous systems and techniques, and improve the process(es) to perform such automated processing.

For example, from within an application, an image portion may be identified and copied from within an image. The copied image portion may be rendered together with (e.g., within) a cursor control element. Simply by resizing the cursor control element, the copied, rendered image portion may also be resized accordingly, e.g., within the cursor control element. For example, as the cursor control element is enlarged or reduced, the copied, rendered image portion within the cursor control element is also enlarged or reduced. In this way, a user may easily preview and designate a desired size of the copied, rendered image portion, and then simply place the cursor control element at a desired destination location (in the same or different image) to complete the desired pasting operation, and with a desired size of the pasted image portion.

In some implementations, the image portion may be an image object from within the image. For example, an image object might be any discrete item pictured within the image, such as a ball, a person, a car, a flower, or any other pictured item. In these implementations, the extracted image object may easily be resized and pasted. In particular, for example, the extracted image object may be resized after the image object extraction, and before the pasting operation is performed. Further, the extracted image object is rendered for previewing prior to the pasting operation, and rendered at a position of the movable cursor control element. Therefore, a user may easily position the extracted image object at a desired destination location, and select a desired size to be pasted, in context at that location.

In many cases, a user wishes to copy and paste an image portion, such as an image object, from a first digital image to a second digital image, where the first and second digital images are different sizes. When the copied image portion is rendered in conjunction with the movable cursor control element, the user may easily position the copied, rendered image portion at a desired location within the second digital image. Then, the user may select the desired size prior to completing the pasting operation.

Further, even within a single digital image, an image object may be resized in order to obtain a desired effect. For example, an image object may be reduced in size, and then positioned to create an illusion of multiple objects in three dimensions (e.g., objects that appear smaller in the distance).

Additionally, the systems and techniques described herein advantageously improve existing technology areas. For example, as described, computer-based image editing is improved. Further, the systems and techniques may be used for a more automated and more efficient and faster approach when applied to the production of both digital and paper documents with included images, as well as when applied to the production of video files.

Figure 1:
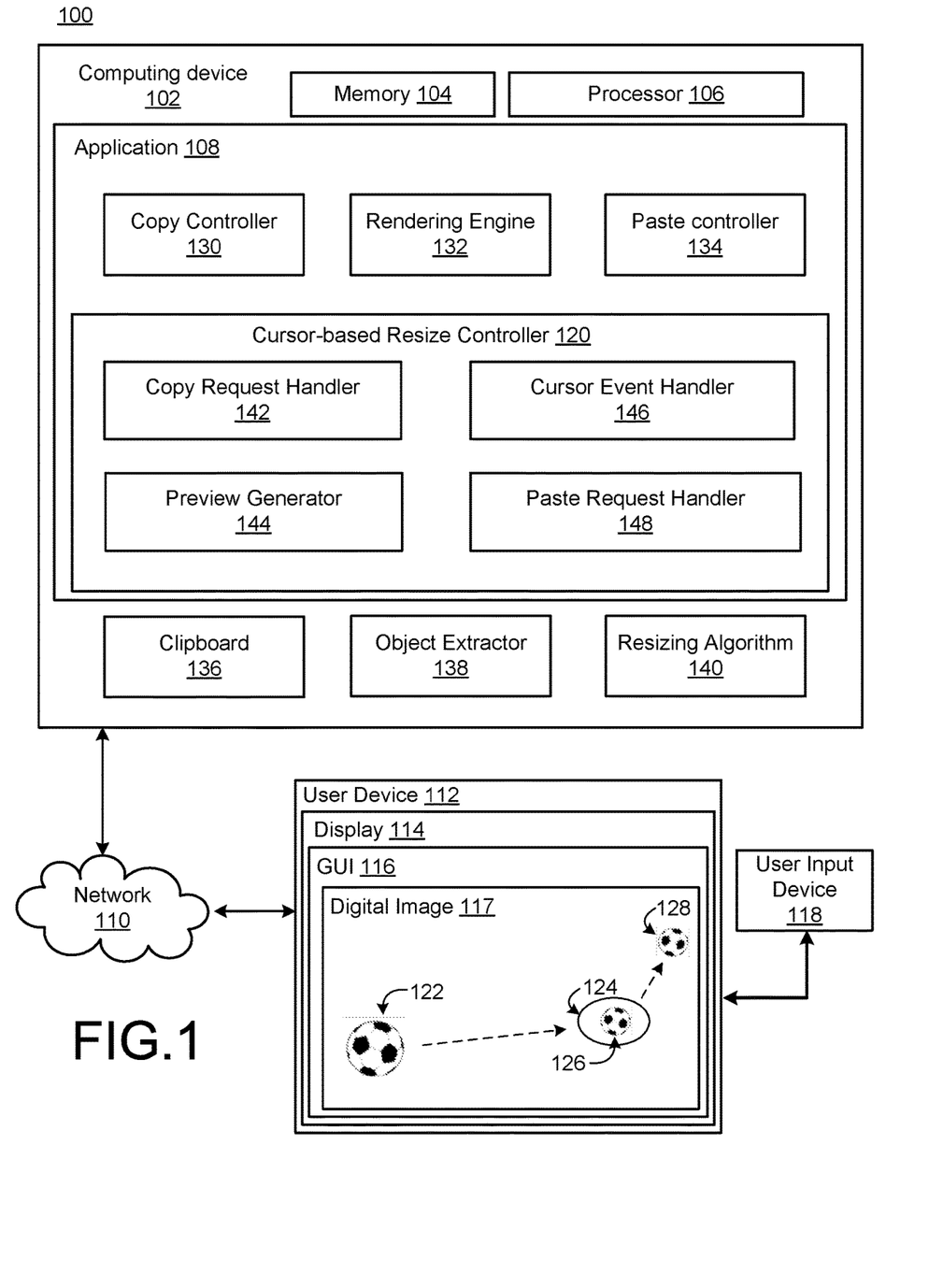
FIG. 1 is a block diagram of a system for cursor-based resizing for copied image portions.

FIG. 1 is a block diagram of a system 100 for cursor-based resizing for copied image portions. The system 100 includes a computing device 102 having at least one memory 104, at least one processor 106 and at least one application 108. The computing device 102 may communicate with one or more other computing devices over a network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The network 110 may be implemented as the Internet, but may assume other, different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102, at the computing device 102. In other implementations, the application 108 may be running on the computing device 102 as a component of a cloud network where a user accesses the application 108 from another computing device 112 (referred to herein as a user device 112) over a network, such as the network 110. In one implementation, the application 108 may be a digital image editing application. In other implementations, the application 108 may represent another type of application, such as a document creation or viewer application, that has, or utilizes, image editing capabilities.

The application 108 may be a standalone application that runs on the computing device 102. Alternatively, the application 108 may be an application that runs in another application, such as a browser application.

In FIG. 1, the application 108 is illustrated as including a display 114 that provides a graphical user interface (GUI) 116. As referenced above, the application 108 may represent an image editing application, and the GUI 116 may represent a corresponding user interface. As also referenced above, the application 108 may include a browser application, so that the GUI 116 represents at least a portion of a browser window.

In the example of FIG. 1, the GUI 116 is illustrated as including a digital image 117. It will be appreciated that the digital image 117 is intended to represent virtually any suitable type of digital image that may be rendered or displayed within the GUI 116. For example, the digital image 117 may be a single digital image, or it may represent one or more image frames of a larger video file. As such, it will be appreciated that the digital image 117 may be included or stored within any corresponding, suitable type of digital image file and associated format, such as a .jpg, .gif, or .mp4 file, to name a few non-limiting examples. Further, although the digital image 117 is illustrated by itself for the sake of clarity and simplicity, it will be appreciated that the digital image 117 may represent a digital image embedded or otherwise included within a larger file, such as a document or other type of text file.

In FIG. 1, a user input device 118 represents any suitable human and/or machine techniques for interacting with the application 108. By way of non-limiting example, the user input device 118 may represent a mouse, stylus, or any hardware element configured for wired or wireless communications with the user device 112 and/or the display 114. The user input device 118 may also represent a touch screen of the display 114, or any gesture-based control system for interacting with the display 114 and the GUI 116.

As referenced above, and in the examples provided herein, the user input device 118 is configured to provide a cursor in conjunction with controlling operations of the GUI 116, and the application 108. In this regard, it will be appreciated that such a cursor may be generally understood to represent any of a number of known or future types of indicators that may be positioned within the GUI 116 by virtue of corresponding movements or other operations of the user input device 118, to thereby designate a spatial position within the GUI 116. Such a cursor is therefore capable of identifying a position within the GUI 116 at which a subsequent action of the user, via the user input device 118, or otherwise, will take effect.

In the simplified example of FIG. 1, the digital image 117 is illustrated as including an image portion 122 that is illustrated as a soccer ball. As shown, in the example of FIG. 1, a cursor-based resize controller 120 may be configured to copy the image portion 122 for rendering in conjunction with a cursor control element 124, as a preview 126 that visually reproduces the copied image portion 122. As referenced above and described in detail below, the cursor control element 124 may be resizable, e.g., through the use of the user input device 118, so that the preview 126 is also resized in conjunction with any resizing of the cursor control element 124. Accordingly, a user of the user input device 118 may easily preview the copied image portion 122, and thereby determine a desired size and location for a pasted image portion 128.

Thus, the cursor control element 124 should be understood broadly to refer to any element that may be associated with controlling operations of at least one cursor controlled by the user input device 118 with respect to the GUI 116. For example, in some implementations, the cursor control element 124 may itself, partially or completely, represent the cursor being controlled by the user input device 118. In other example implementations, such as described and illustrated below with respect to FIGS. 3 and 4, the cursor control element 124 may be implemented using a slider bar or other sizing control element that is selectable or configurable by the user of the user input device 118.

In order to provide the above features and advantages, as well as many other features and advantages described in detail, below, the cursor-based resize controller 120 may utilize a number of available and existing resources, both within and external to the application 108. For example, in FIG. 1, the application 108 is illustrated as including a copy controller 130, which generally represents an existing copy functionality of the application 108. For example, the copy controller 130 may represent a portion of the application 108 configured to implement copying operations of images, image portions, text, or other data normally used in the context of the application 108.

Similarly, a rendering engine 132 generally represents a rendering functionality of the application 108. As such, the rendering engine 132 may be understood to be used in rendering the digital image 117, and any other normal rendering operations that may be performed by the application 108.

Further, a paste controller 134 illustrates one or more modules and associated functionality for pasting images or other data copied by the copy controller 130. Thus, as with the copy controller 130 and the rendering engine 132, various known features and functions of the paste controller 134 would be apparent to one of skill in the art, and are not otherwise described here in detail, except as may be necessary or helpful in understanding operations of the cursor-based resize controller 120. For example, with respect to the copy controller 130 and the paste controller 134, it will be appreciated that any existing keyboard shortcut techniques for copying/pasting data may be used, as well as any input features that may be particular to a type of the user input device 118 being used (e.g., a 'fight-click' of a computer mouse).

In the example of FIG. 1, the copy controller 130, the rendering engine 132, and the paste controller 134 are illustrated as being implemented using the application 108. In various implementations, however, it will be appreciated that these and other components and associated functionalities may be partially or completely executed external to the application 108.

For example, these and related functionalities may be performed using an operating system of the computing device 102, and/or an operating system of the user device 112. For example, a clipboard 136 may represent a temporary memory that may be configured for use across a plurality of applications or application instances, including the application 108. Thus, image data or other data copied by the copy controller 130 may be stored using the clipboard 136, and ultimately pasted therefrom by the paste controller 134. In other examples, the rendering engine 132 may be partially or completely implemented using resources of the GUI 116, such as when the GUI 116 represents a browser application.

Further in FIG. 1, an object extractor 138 represents a resource available to the application 108 and configured to extract the image portion 122 as a discrete item, element, or other object from within the digital image 117. In this regard, more detailed example implementations of operations of the object extractor 136 in the context of the system 100 of FIG. 1 are provided below, e.g., with respect to the screenshots of FIGS. 3 and 4.

In general, however, it will be appreciated that the object extractor 136 is configured to consider any background image data that may exist within the digital image 117 with respect to the soccer ball 122, where such background imagery is not pictured in FIG. 1, for the sake of simplicity and clarity. By extracting the soccer ball 122 as a discrete object from within any such background imagery, the preview 126 may be rendered as a resizable version of the extracted image object, to thereby facilitate a desired pasting of the image object as the pasted image object 128. Such copying, previewing, resizing, and pasting may be provided, without regard for any background imagery that may exist at either the source location of the soccer ball 122, or at the destination location of the pasted soccer ball 128 (and regardless of whether the destination location is within the digital image 117, or another digital image).

Further in FIG. 1, a resizing algorithm 140 represents one or more known techniques for performing proportional resizing of image data. That is, as illustrated in the simplified example of FIG. 1, the resizing algorithm 140 may be configured to assist in reducing or enlarging a size of the, e.g., soccer ball 122, while maintaining internal proportions of the image being resized.

Thus, it will be appreciated that the various modules 130-140 and associated functionalities illustrated in FIG. 1 are intended merely to provide an example implementation(s) for purposes of describing operations of the cursor-based resize controller 120. As referenced, any other implementations are possible, or would be apparent. In particular, as also referenced, any one or more of the modules 130-140 may be implemented partially or completely within the application 108, the computing device 102, the user device 112, and/or any other suitable hardware/software resources that may be available by way of the network 110.

Further, and similarly with respect to the cursor-based resize controller 120 itself, it will be appreciated that the cursor-based resize controller 120 may also be implemented partially or completely within the application 108, or may be partially or completely external to, and accessible by, the application 108. For example, the cursor-based resize controller 120 may be provided as a service that is available to, and interfaces with, a plurality of software applications represented by the application 108.

In operation, the cursor-based resize controller 120 may utilize a copy request handler 142 to receive an initial request from a user of the user input device 118, with respect to the digital image 117. For example, as described and illustrated below with respect to FIG. 3, such an initial request may include a request for activation of the cursor-based resize controller 120. Once activated, a specific copy request may be received with respect to a designated image portion.

In this regard, it will be appreciated that the term image portion should be understood to refer to any specified subset of image data from within the digital image 117. For example, an image portion may thus prefer to a designated subset of pixels, including continuous or adjacent pixels, or a specified area or shape of pixels. For example, a user of the user input device 118 may utilize available functionality of the user input device 118 to encircle, highlight, or otherwise designate a particular portion of the digital image 117 for copying, irrespective of any included content thereof.

In other example implementations, and as illustrated in the example of FIG. 1, the copy request handler 142 may utilize the object extractor 136 to identify a specific, pictured element of the digital image 117, such as the soccer ball 122. For example, a user of the user input device 118 may designate a center portion of the pictured soccer ball 122 (e.g., using a cursor operated by the user input device 118), and the copy request handler 142 may utilize the object extractor 136 to thereafter extract the image of the soccer ball 122, independently of any background imagery of the digital image 117 that may exist.

Thus, in the example of FIG. 1, the copy request handler 142 may detect a cursor-based selection event at a position corresponding to a center of the pictured soccer ball 122, and may pass the appropriate image data and cursor selection data to the object extractor 138, which may then proceed to extract the soccer ball 122 as a discrete object from the digital image 117, whereupon the copy controller 130 may be configured to store the extracted image object for the soccer ball 122, e.g., using the clipboard 138.

Subsequently, a preview generator 144 of the cursor-based resize controller 120 may be configured to generate the preview 126, in conjunction with the cursor control element 124. For example, the preview generator 144 may utilize the rendering engine 132 to render the preview 126.

In some operations, the preview generator 144 may be configured with various default parameters. For example, the preview generator 144 may initially generate the preview 126 and the cursor control element 124 with a default position defined with respect to the original source location of the copied image portion. For example, it may occur that the preview 126 and the cursor control element 124 are initially rendered at a position over the soccer ball 122. In other implementations, the preview generator 144 may be configured to render the preview 126 and the cursor control element 124 at any desired, default position, such as at a center of the digital image, or at some location defined with respect to a visible portion of the digital image 117 within the GUI 116. Similarly, the preview generator 144 may be configured to provide a default size of the preview 126. For example, the preview 126 may initially be generated at a size that is equivalent to a size of the copied image portion 122 itself.

In the example of FIG. 1, as referenced above, it may occur that the cursor control element 124 represents the cursor used by the user input device 118 to designate selection of the soccer ball 122. That is, although a cursor may be implemented as an arrow, pointer, or other type of indicator of a particular point within the digital image 117, the cursor may also be implemented as a circle, oval, ellipse, or other appropriate shape, with the rendered preview 126 being illustrated therein. In such cases, a size of the cursor control element 124 may be directly or indirectly controlled by the user input device 118, such as when using a separate, selectable sizing control, such as the slider bar example of FIG. 3, below. In other example implementations, the cursor may continue to be implemented and illustrated as an arrow or other pointer, which may itself then be used to resize a pictured area of the cursor control element 124.

Once the preview 126 and the cursor control element 124 have been rendered or otherwise provided, a cursor event handler 146 may proceed to detect any subsequent change event received with respect to a location and/or size of the cursor control element 124. For example, as indicated by the dash lines in FIG. 1, the preview 126 and the cursor control element 124 may be moved from an initial location corresponding to the location of the soccer ball 122, to a final, selected destination location indicated by the pasted soccer ball 128.

As already referenced, the cursor event handler 146 may also be configured to detect and respond to size change events associated with the cursor control element 124. For example, using an appropriate cursor size control technique received via the user input device 118, the cursor control element 124 may have its size enlarged or reduced.

For example, it may occur that the preview 126 is initially an identical size of the image object 122. Thereafter, a size of the cursor control element 124 may be reduced, whereupon the cursor event handler 146 may detect the size reduction request, and provide the copied image object 122 from the clipboard 138 to the resizing algorithm 140. In particular, the cursor event handler 146 may provide relevant resizing parameters in conjunction with providing the copied image object from the clipboard 138. For example, the cursor event handler 146 may provide a factor by which the copied image object is reduced. For example, the cursor event handler 146 may detect that the cursor control element 124 has been reduced by a factor of one half, or by any other detected percentage reduction in size, and may provide this reduction factor to the resizing algorithm 140.

Once the resized image object has been obtained by way of the resizing algorithm 140, the preview generator 144 may be configured to render an updated preview that conforms with, and illustrates, actions of the resizing algorithm 140. Such resizing events may continue, in conjunction with various cursor event detections by the cursor event handler 146 and corresponding preview generations by the preview generator 144, until the user is satisfied with a current size and location of the preview 126. At such time, the user may request a reproduction or other pasting of the preview 126 at a specified location. For example, the paste request handler 148 may detect a paste request from the user in conjunction with the illustrated, destination location of the pasted image object 128. At that point, the paste request handler 148 may utilize various existing versions and aspects of the included paste controller 134 of the application 108, as referenced above.

Figure 2:
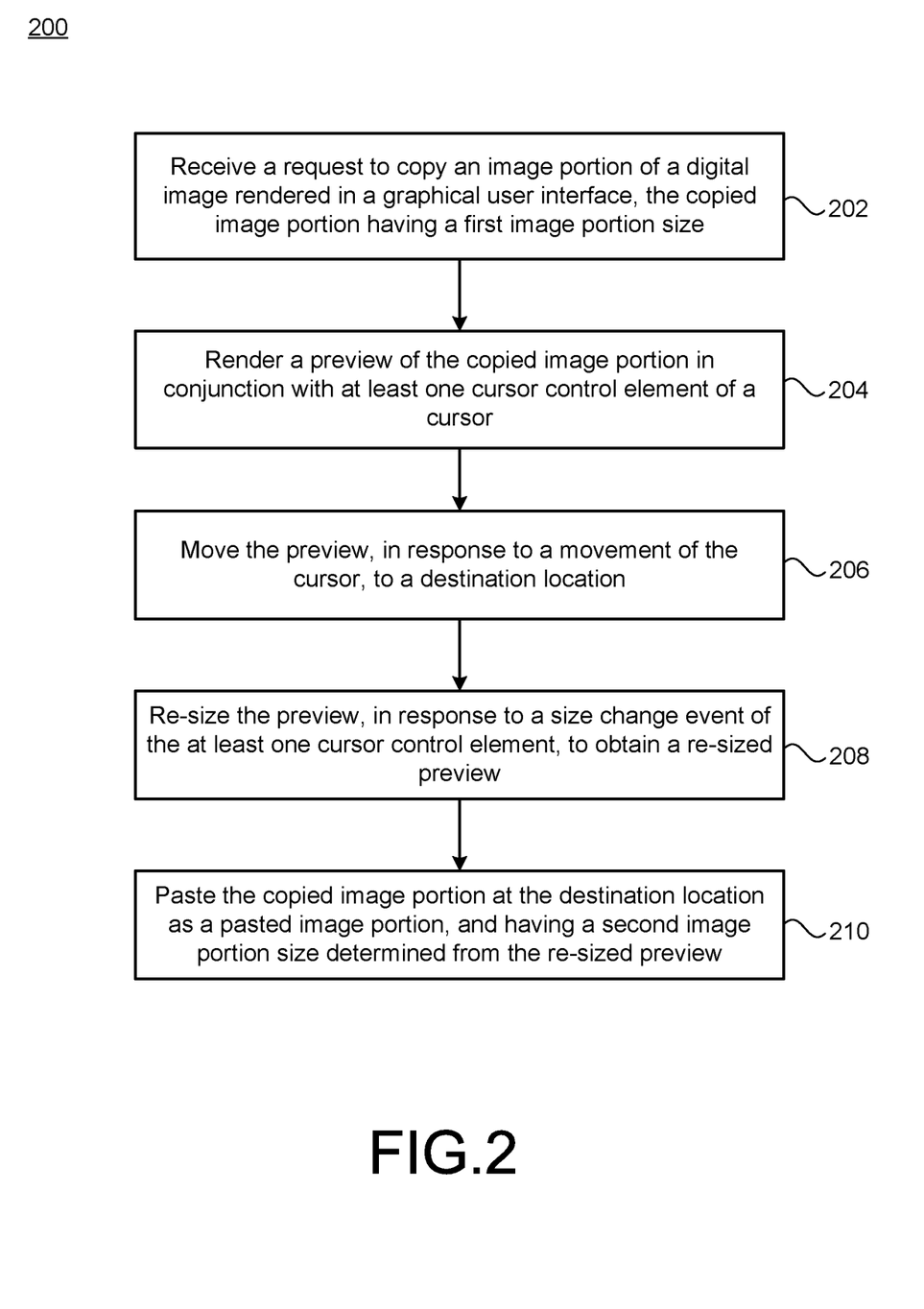
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. It will be appreciated, however, that in various implementations, additional or alternative operations or sub-operations may be included, and/or one or more operations or sub-operations may be omitted. Further, it may occur that any two or more of the operations or sub-operations may be executed in a partially or completely overlapping or parallel manner, or a nested, iterative, looped, or branched fashion.

In the example of FIG. 2, a request to copy an image portion of a digital image rendered in a graphical user interface may be received, the copied image portion having a first image portion size (202). For example, the copy request handler 142 of the cursor-based resize controller 120 may receive a request to copy an image portion of the digital image 117. As described, the copied image portion may simply include a designated area of the digital image 117, or may include an identified, discrete element or object extracted from the digital image 117 (such as the example of the soccer ball 122 described above with respect to FIG. 1). Thus, the copied image portion may have a size that is determined simply by a size selection made by the user when designating an area of the digital image 117 to be included in the copied image portion, or may have a size corresponding to the detected, extracted size of the designated image object that is extracted.

A preview of the copied image portion may be rendered in conjunction with at least one cursor control element of a cursor (202). For example, the preview generator 144 may generate the preview 126, in conjunction with the cursor control element 124. As referenced above, the cursor control element 124 may, in some implementations, refer to the cursor itself, and/or may refer to one or more graphical user interface elements that are rendered and utilized in conjunction with the cursor (e.g., such as the slider bar of FIG. 3, below, or other graphical size selection tool). Of course, the system 100 of FIG. 1 may also provide two or more such cursor control elements, so that the user of the user input device 118 may select a preferred technique for resizing the preview 126 from among the available options.

In response to a movement of the cursor, the preview may be moved to a destination location (206). For example, in scenarios in which the cursor control element 124 represents the cursor itself, simply moving the cursor by way of the user input device 118 will result in movement of the preview 126 to a desired location within the digital image 117. In other implementations, the cursor control element 124 may be separate from, but used in conjunction with, the cursor, whereupon the cursor may be utilized to move the cursor control element 124 and included preview 126 to a desired destination location. As referenced above and illustrated below with respect to FIG. 4, the destination location may exist within a separate digital image from the digital image 117 having the source location of the copied image portion 122.

The preview may be resized, in response to a size change event of the at least one cursor control element, to obtain a resized preview (208). For example, the cursor event handler 146 may detect an enlargement or reduction of an edge, parameter, or area of the cursor control element 124. As described, such enlargement/reduction may occur directly by movement of the edge or parameter of the cursor control element toward or away from the preview 126, or may be detected in response to a separate cursor control element, such as a slider bar or other size selection element.

Of course, operations 206, 208 may be performed as many times as desired to obtain a desired result. For example, the user could resize the preview 126 multiple times, until a desired size is obtained. Similarly, the user may move the preview 126 to multiple potential destination locations, before selecting the final destination location of the image portion 128. Further, of course, the user may easily select multiple destination locations and/or multiple sizes, within and among one or more digital images.

Finally with respect to FIG. 2, the copied image portion may be pasted at the destination location as a pasted image portion, and having a second image portion size determined from the resize preview (210). For example, the paste request handler 148 may utilize the paste controller 134 to paste the preview 126 from the clipboard 138 to the destination location of the illustrated image object 128. Thus, the size of the pasted image object 128 will be determined from, e.g., will match, the existing size of the preview 126 at a time that the paste request is received.

Similarly, although FIG. 1, using the illustrated dashed arrows, illustrates movement of the preview 126 from the source location of the copied image object 122 toward the destination location of the pasted image object 128, it will be understood that, in normal operations, the designated destination location will simply correspond to the current position or location of the preview 126 at the time of receipt of the paste request by the paste request handler 148. For example, in FIG. 1, another instance of the pasted image object 128 may be pasted at the illustrated location of the preview 126 with respect to the digital image 117, that the resulting pasted image object would be overlaid by the preview 126 in the simplified example of FIG. 1, and therefore would not be visible within the example of FIG. 1.

Figure 3:
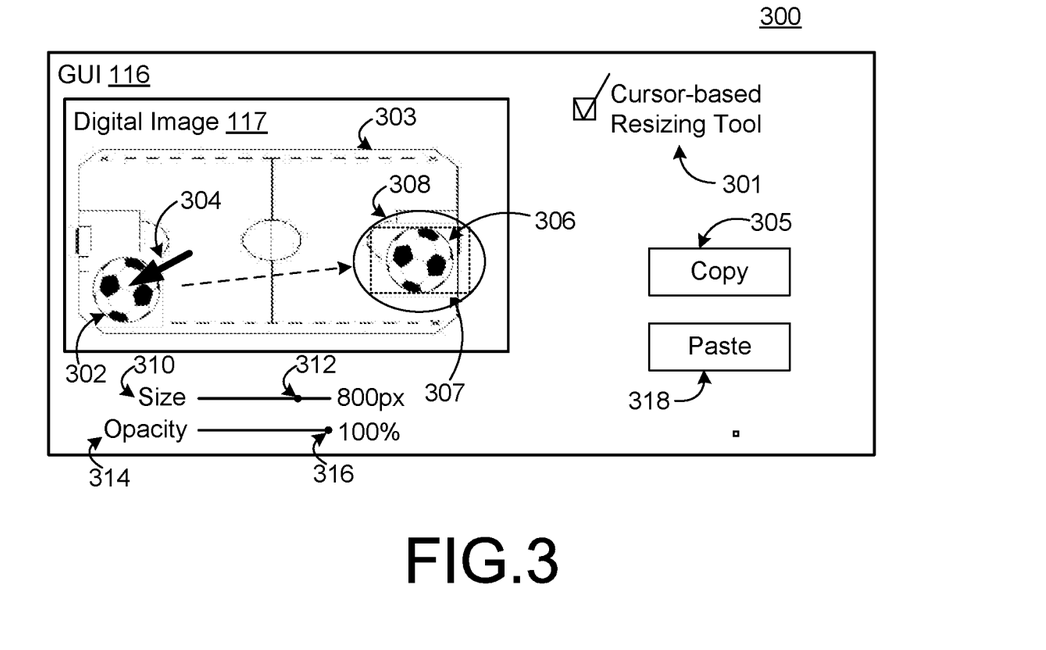
FIG. 3 illustrates a first screenshot of an example implementation of the system of FIG. 1.

FIG. 3 is a screenshot 300 illustrating more detailed example implementations of the system 100 of FIG. 1. As shown, the screenshot 300 illustrates the GUI 116 and the digital image 117 of FIG. 1 in more detail.

In particular, the screenshot 300 includes a checkbox 301 for initiating operations of the cursor-based resize controller 120. In other words, at any time during a viewing or editing of the digital image 117, the user may simply check, or otherwise select, the checkbox 301 to initiate any of the various operations described herein. Of course, any other suitable tool selection technique, such as a drop-down menu, may also be utilized.

The screenshot 300 illustrates an image object 302 to be copied, which continues the example of the soccer ball illustrated in FIG. 1. In FIG. 3, however, the digital image 117 is illustrated as including a background 303. In the simplified example of FIG. 3, the background 303 illustrates an example pitch or field in which the soccer ball 302 might be pictured.

In the example of FIG. 3, a cursor 304 is illustrated as an arrow, and, as shown, the cursor 304 may be used to indicate an approximate center of the soccer ball 302. Accordingly, when the user invokes a copy functionality of the copy request handler 142, represented in FIG. 3 as a copy button 305, the copy request handler 142 may proceed to utilize the external object extractor 136 to identify and extract the soccer ball 302 as an extracted image object. Of course, depending upon a configuration of the cursor-based resize controller 120 at a time that the checkbox 301 is selected, many other techniques for invoking the copy request handler 142 may also be used. For example, the copy request may be initiated simply in response to a clicking of the cursor 304 at the center position of the imaged soccer ball 302, or in response to a preconfigured keyboard shortcut, or in response to a "right click" functionality of a mouse corresponding to the user input device 118 of FIG. 1.

However the referenced copy functionality is invoked and implemented, including use of the object extractor 136 to extract the soccer ball 302, the preview generator 144 may proceed to utilize the copied image object from the clipboard 138, for rendering as a preview 306. As referenced above, the preview generator 144 may be configured to render the preview 306 in any one or more of a plurality of available manners. For example, the preview generator 144 may be configured to render the preview 306 at the original, source location of the image object (soccer ball) 302. In other implementations, the preview generator 144 may be configured to render the preview 306 at a center of the digital image 117, or at some rendered location that is defined as a default with respect to the source location, the digital image 117, or generally within the GUI 116.

As with the default location of the rendered preview 306, the preview generator 144 may also be configured to render the preview 306 with a default size. For example, as illustrated in FIG. 3, the preview generator 144 may utilize an output of the object extractor 136 to define a bounding rectangle 307 that is of sufficient size to completely enclose the preview 306. In practice, the bounding rectangle 307 may be implemented using a different shape, and may or may not be rendered visibly with respect to the preview 306 within the GUI 116.

In addition to defining and otherwise characterizing a size of the preview 306, the bounding rectangle 307 may also be used to define and characterize a size of a corresponding cursor control element 308. The cursor control element 308 may be implemented using one of a plurality of available shapes, such as a circle, oval, or ellipse.

Further, in various implementations, the cursor control element 308 may represent a version or instance of the cursor 304. For example, the cursor 304 may be transformed for illustration as the cursor control element 308 in response to invocation of the copy functionality represented by the copy button 305. In other implementations, the cursor 304 may be transformed for illustration in a shape corresponding to the cursor control element 308 immediately upon selection of the checkbox 301. In such implementations, for example, it may occur that the user designates the soccer ball 302 as the desired image object to be extracted by enclosing the soccer ball 302 within the thus-transformed (e.g., circular) version of the cursor 304.

Thereafter in FIG. 3, the preview 306 may be resized, using one or more available resizing operations executed in conjunction with operations of the cursor event handler 146. For example, the cursor control element 308 may selectively be directly enlarged or reduced by the user, such as by highlighting some or all of a parameter or edge of the cursor control element 308, and then executing cursor movements away from the center of the preview 306 to enlarge the preview 306, or toward the center of the preview 306 to reduce the size of the preview 306.

As referenced above, the GUI 116 may also be provided with various other digital image editing tools and features. For example, as referenced above, a slider bar 310 may be designated specifically to control and/or reflect size changes made with respect to the preview 306. As shown, an indicator 312 may be rendered to indicate a current position along the slider bar 310, and corresponding to a size of the preview 306.

For example, the indicator 312 may move left or right along the slider bar 310 in response to the types of changes made with respect to an area of the cursor control element 308. In additional or alternative implementations, the user may directly move the indicator 312 along the slider bar 310, and thereby cause corresponding enlargements or reductions of the cursor control element 308 and the preview 306. As shown, and as described in detail below with respect to FIGS. 5-6, the slider bar 310 may be used to indicate a size of the preview 306, measured in pixels.

Various other digital image editing techniques and tools may be used. For example, a separate slider bar 314 reflects an opacity percentage designated by a selectable indicator 316. For example, the opacity indicator 316 may be set in a manner that allows the user to see through the preview 306 to varying degrees. For example, this feature may enable the user to view a positioning and placement of the preview 306 with respect to the background 303 of the digital image 117, so that the user may more easily and more conveniently select a destination location within the digital image 117 and thereby complete corresponding pasting operations thereof.

As referenced above and also described in more detail below with respect to FIGS. 5 and 6, the cursor event handler 146 may be configured to detect any of the various types of cursor size/location change events, including, when necessary, accessing the clipboard 138 and the resizing algorithm 140 in order to execute specified resizing operations. Then, once the user has completed all relevant selections with respect to the desired size and destination location of a preview 306, the user may proceed to invoke paste functionality of the paste request handler 148 and the paste controller 134, represented by a paste button 318 in FIG. 3.

Figure 4:
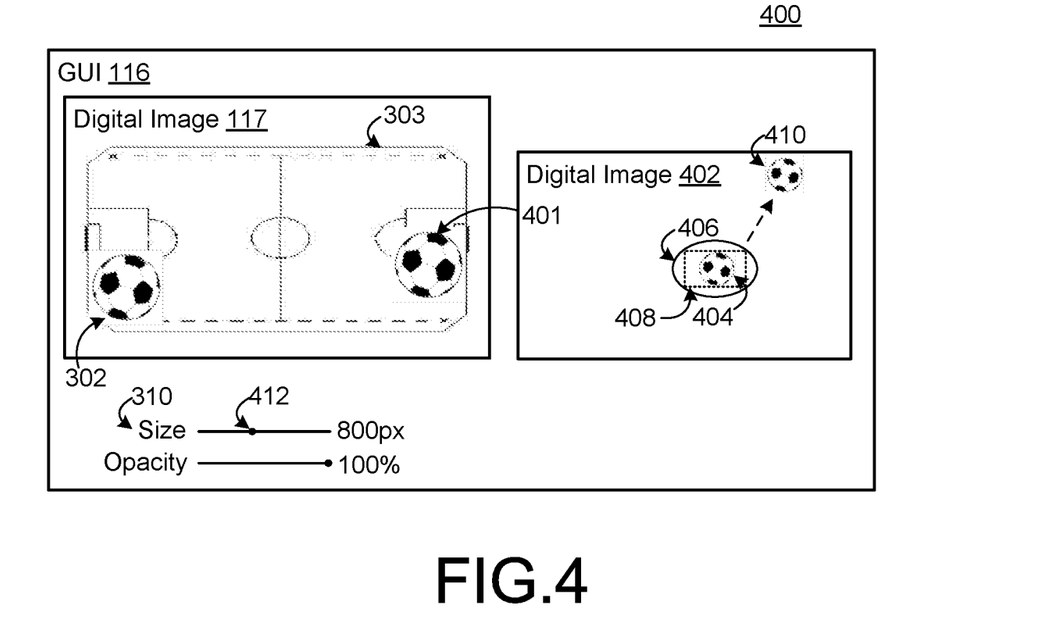
FIG. 4 illustrates a second screenshot of an example implementation of the system of FIG. 1.

Of course, as already described with respect to the copy button 305, the paste button 318 should be understood generally to represent any known or future technique for invoking corresponding paste operations, and parameters or characteristics thereof. For example, the paste request handler 148 may be configured to implement the paste controller 134 and paste the preview 306 as a pasted image object 401, as illustrated in FIG. 4. That is, by placing the preview 306 at the illustrated destination location, and then using a corresponding combination of shortcut keys, right click mouse selections, the paste button 318, or other appropriate techniques for requesting a paste operation, the paste request handler 148 may be invoked and configured to complete the pasting of the preview 306 at the illustrated destination location, to obtain the pasted image object 401.

In the illustrated screenshot 400 of FIG. 4, a second digital image 402 is further illustrated to provide an example in which the rendered preview 306 is pasted with a desired size/location within the separate digital image 402. For example, as illustrated, a preview 404 may be rendered within the second digital image 402, e.g., in response to movement of the cursor control element 308 from within the digital image 117 to within the digital image 402. Either before or after such movements, the bounding rectangle 307 may be resized (e.g., reduced) to obtain a smaller bounding rectangle 408. The cursor control element 308 may similarly be resized (reduced) to obtain a cursor control element 406.

As shown, the cursor control element 406 may thus be moved to any desired location with the digital image 402. As also shown, the result of such movements and associated indication of the paste request handler 148 may result in pasting of a pasted image object at the illustrated destination location within the digital image 402.

In FIG. 4, the slider bar 310 continues to represent a rendered size of the cursor control element, bounding rectangle 408, and/or the preview 404. Specifically, as shown, a selectable indicator 412 is illustrated as being further to the left as compared to the indicator 312 of FIG. 3, thereby indicating a correspondingly smaller size of the preview 404, as compared to the preview 306.

Figure 5:
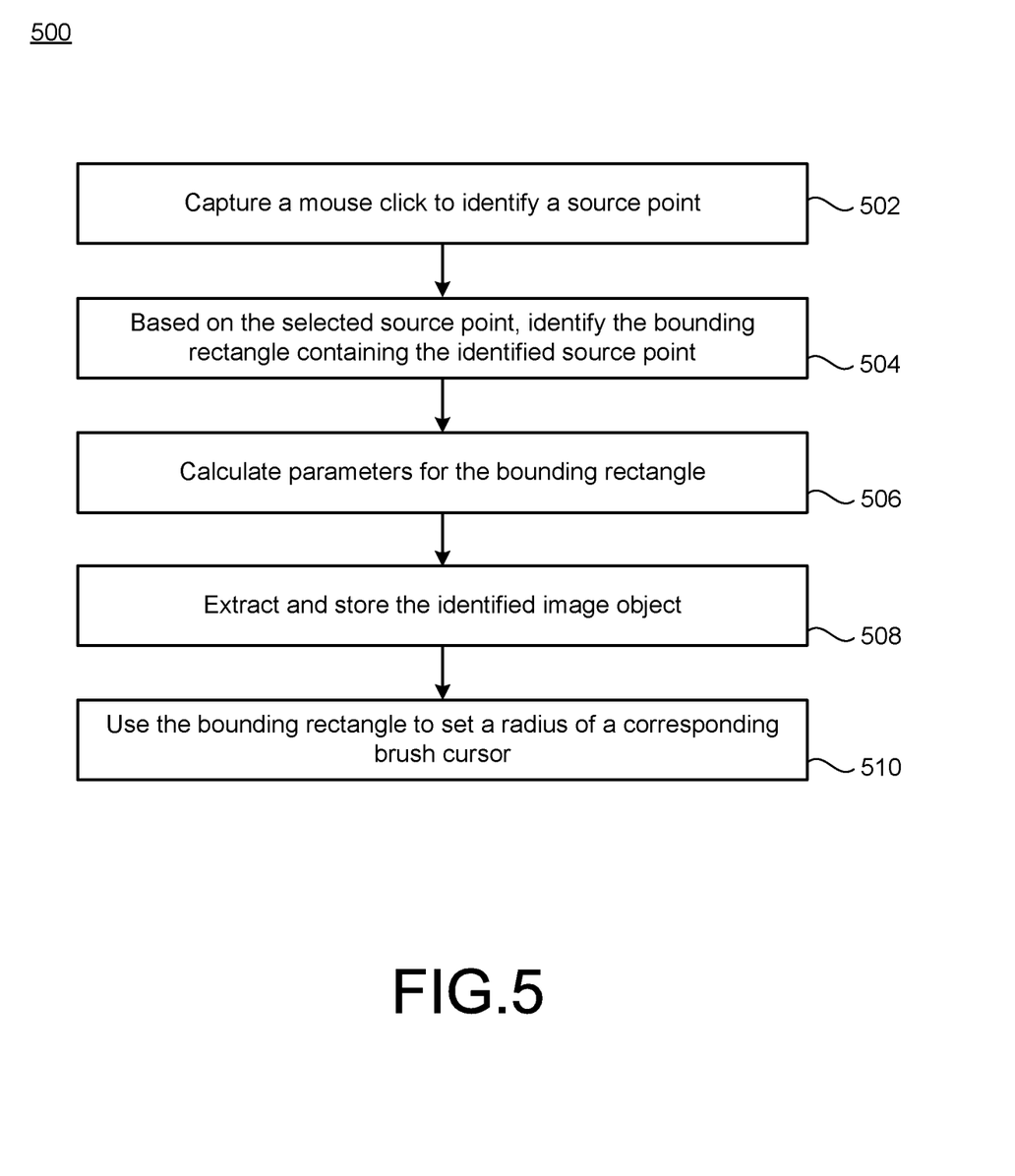
FIG. 5 is a first flowchart illustrating more detailed example operations of the flowchart of FIG. 2.
Figure 6:
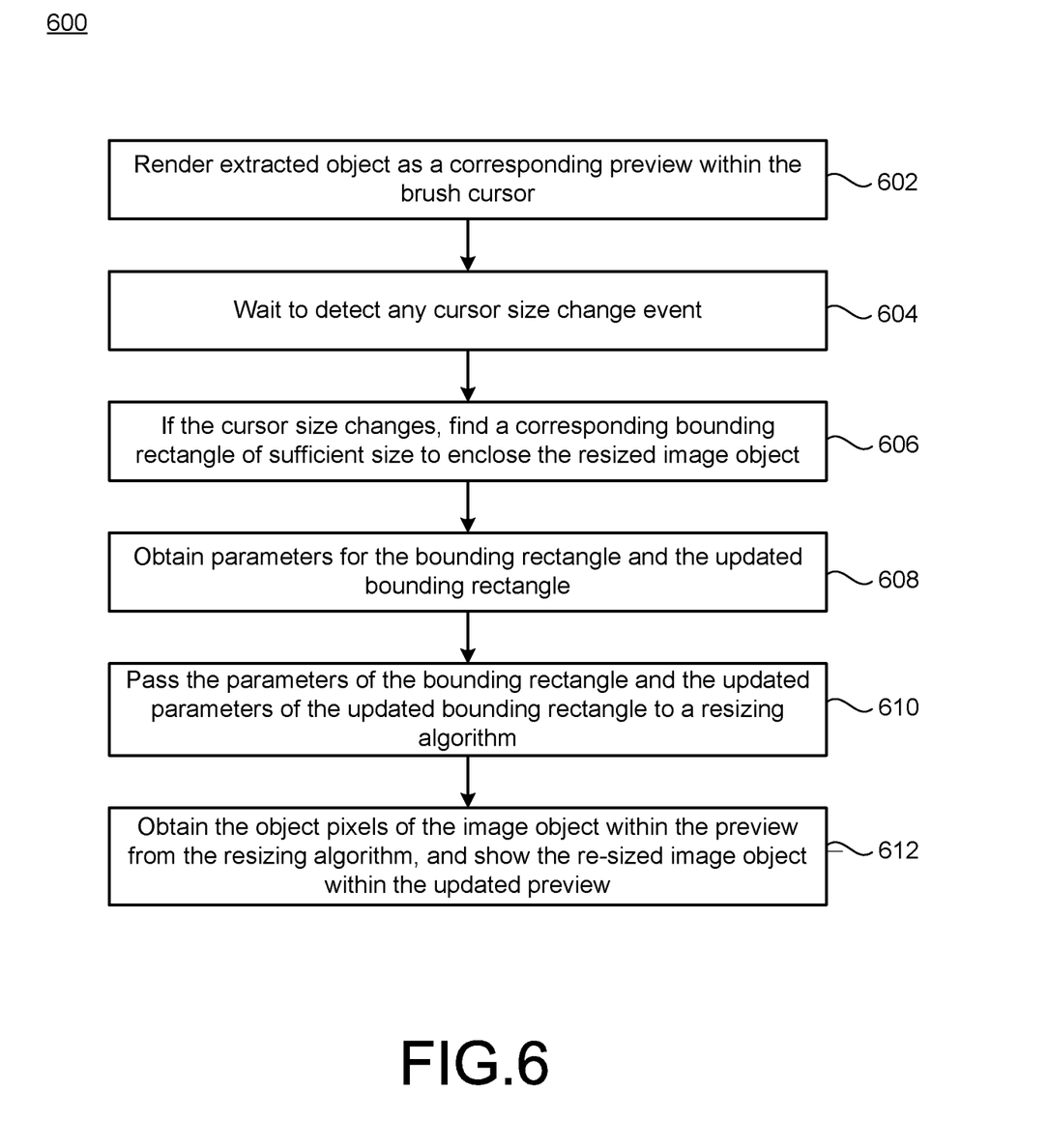
FIG. 6 is a second flowchart illustrating more detailed example operations of the flowchart of FIG. 2.

In the examples of the flowcharts 500 and 600 of FIGS. 5 and 6, respectively, it is assumed for the sake of example that the application 108 represents the well-known digital image editing software known as Photoshop, produced by Adobe Systems Incorporated. Further in the examples, the user input device 118 may be referred to as a computer mouse, performing, e.g., associated click-based selection techniques. Further, the cursor control element (e.g., the cursor control element 124 of FIG. 1, or the cursor control elements 308/406 of FIGS. 3 and 4) may be referenced as a "brush cursor." As is known, such a brush cursor may refer to a circular cursor used to, e.g., sample and paint selected image portions, such as may occur in conjunction with the clone stamp tool of Adobe Photoshop.

In more detail, FIG. 5 illustrates operations associated with identifying a most prominent object within a specified digital image, based on a selected source point. Thus, in FIG. 5, a mouse click may be captured to identify such a source point (502). For example, such a mouse click associated with invocation of the cursor 304 at a center of the soccer ball 302 in FIG. 3 may be captured. In this regard, it will be appreciated that such source point identification may be provided in conjunction with operations of the copy request handler 142, as well as the cursor event handler 146.

Based on the selected source point, the object extractor 136 may be invoked to identify the bounding rectangle 307 containing the identified source point (504). Parameters for the bounding rectangle 307 may thus be calculated (506). For example, a width W and a height H of the bounding rectangle 307 may be determined and expressed in pixels.

An extraction functionality of the object extractor 136, such as an existing auto selection algorithm included with the Photoshop digital image editing software may be used, to thereby extract the thus-identified image object 302, which may be stored using the clipboard 138 (508). Further, the bounding rectangle 307 may thus be used to automatically set a radius of a corresponding brush cursor, which may then be shown to the user (510).

For example, the bounding rectangle 307 may be used to set and render the cursor control element 308 as a circular brush cursor. For example, a radius of such a circular cursor, on which the rendered preview may be shown as an overlay, may be defined as Max (W, H)/2.

FIG. 6 is a flowchart 600 illustrating example operations associated with resizing the image object extracted in FIG. 5, based on a corresponding size of the brush cursor represented by the cursor control element 308 of FIG. 3. In FIG. 6, the extracted object is initially rendered as a corresponding preview within the brush cursor (602). For example, the preview 306 is rendered within the brush cursor 308.

As described above, the cursor event handler 146 waits to detect any cursor size change event (604). That is, as long as no such cursor size change event happens, the cursor event handler 146 will simply remain in an active wait mode.

On the other hand, if the cursor size changes, then the cursor event handler 146 may proceed to find a corresponding bounding rectangle of sufficient size to enclose the resized image object (606). For example, with respect to FIGS. 3 and 4, if the brush cursor 308 is reduced in size to obtain the smaller brush cursor 406, then the bounding rectangle 307 will be replaced with the bounding rectangle 408. In specific implementations, in response to a cursor size change, a new rectangle capable of enclosing the object may be defined, e.g., as the largest rectangle that can be drawn inside the circular cursor. For example, the cursor size may be reduced by fifty percent, such as from 100 pixels to 50, or may be increased by fifty percent, such as from 100 to 150 pixels.

Parameters for the thus-obtained bounding rectangle 408 may thus be obtained (608). For example, the new rectangle height for the bounding rectangle 408 may be designated as H', with a corresponding new width of W' (e.g., H'/2 and W'/2 in the example of a fifty percent reduction, or 1.5H' and 1.5 W' in the example of a fifty percent increase).

The cursor event handler 146 may then pass the dimensions H, W of the bounding rectangle 307 and the updated rectangle parameters H', W' to the resizing algorithm 140 (610). The object pixels of the image object within the preview 306 may thus be obtained from the resizing algorithm 140, and the resized image object may be shown within the updated preview 404, as shown in FIG. 4 (612). Accordingly, a resized object that is fifty percent smaller or larger may be rendered, and ultimately pasted at a desired destination location, as described and illustrated herein.

Thus, in various implementations, the described systems and methods demonstrate techniques for showing an image object (or portion thereof) inside a brush cursor, e.g., after setting the source point for the image object in a single click. Further, the described techniques provide methods to resize a preview of an image object, by controlling the size of the cursor. Still further, the described techniques provide methods to copy, preview, resize, and paste an image object, in a maximum of two clicks, from a source location to a destination location.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   receive a first location indication from a cursor of a point on a digital image rendered in a graphical user interface;
   identify a bounding box of an image object based on the first location indication;
   extract and copy, based on the point, an image object from the digital image that includes the point, the copied image object having a first image portion size;
   render a cursor control element of the cursor based at least in part on a size of the bounding box;
   render a preview of the copied image object within the cursor control element of the cursor;
   move the cursor and the preview to a destination location;
   receive a size change event for the cursor from a cursor event handler;
   re-size the cursor control element of the cursor based on the size change event to obtain a resized cursor;
   identify a largest rectangle that fits within the cursor control element;
   re-size the preview based on the size change event of the cursor and the identified largest rectangle to obtain a re-sized preview; and
   paste, in response to a second location indication from the cursor, the copied image object at the destination location as a pasted image object, and having a second image portion size determined from the re-sized preview,
   wherein the first location indication is a first cursor click, and the second location indication is a second cursor click, and the first cursor click and the second cursor click are the only two cursor clicks required to paste the pasted image object having the second image portion size.

2. The computer program product of claim 1, wherein the instructions, when executed to re-size the cursor and the preview, are further configured to cause the at least one computing device to:
   reduce or enlarge the preview in response to a corresponding reduction or enlargement of the cursor during the size change event thereof.

3. The computer program product of claim 1, wherein the destination location is included within a second digital image.

4. The computer program product of claim 1, wherein the cursor is controlled by a size selection element configured to receive the size change event.

5. The computer program product of claim 1, wherein the preview is rendered with a preview size defined with respect to a bounding rectangle enclosing the preview image, and further wherein the preview is re-sized in conjunction with changing dimensions of the bounding rectangle.

6. The computer program product of claim 1, wherein the instructions, when executed to re-size the preview, are further configured to cause the at least one computing device to:
   provide preview parameters characterizing the preview to a resizing algorithm; and re-size the preview, based on an output of the resizing algorithm.

7. The computer program product of claim 1, wherein the cursor includes a circular brush cursor, and further wherein the preview is rendered inside the circular brush cursor.

8. A computer-implemented method, the method comprising:
   receiving a first location indication from a cursor of a point on a digital image rendered in a graphical user interface;
   identifying a bounding box of an image object based on the first location indication;
   extracting and copying, based on the point, an image object from the digital image, the copied image object having a first image portion size;
   rendering a cursor control element of the cursor based at least in part on a size of the bounding box;
   rendering a preview of the copied image object within the cursor control element of the cursor;
   moving the cursor control element and the preview, to a destination location specified by the cursor;
   receiving a size change event for the cursor from a cursor event handler;
   identifying a largest rectangle that fits within the cursor control element;
   re-sizing the cursor control element and the preview, in response to the size change event of the cursor, to obtain a re-sized cursor and re-sized preview, wherein the re-sizing comprises a proportional resizing of the preview based on the size change event and the identified largest rectangle while maintaining internal proportions of the preview; and
   pasting, in response to a second location indication from the cursor, the copied image object at the destination location as a pasted image object, the copied image object being pasted with a second image portion size determined from the re-sized preview.

9. The computer-implemented method as in claim 8, wherein the preview is rendered at a source location defined with respect to a location of the image object within the digital image.

10. The computer-implemented method as in claim 8, wherein the cursor includes a size selection element configured to receive the size change event.

11. A computer program product, the computer program product being tangibly embodied on a non-transitory computer-readable storage medium and comprising instructions that, when executed by at least one computing device, are configured to cause the at least one computing device to:

receive a first click on a digital image rendered in a graphical user interface, the first click indicating a point on the digital image;

identify a bounding box of an image object based on the first click;

extract and copy, based on the first click, the image object from the digital image that includes the point;

render a cursor control element of a cursor based at least in part on a size of the bounding box;

generate a preview of the copied image object that is overlaid on the digital image and included within the cursor control element of the cursor;

receive a size change request for the cursor and the preview, wherein the size change request comprises a size change event for the cursor;

change a size of the cursor control element of the cursor and the preview, based on the size change request to obtain a resized cursor;

identify a largest rectangle that fits within the cursor control element;

change a size of the preview based on the size change request and the identified largest rectangle to thereby obtain a re-sized cursor and re-sized preview;

move the re-sized cursor and re-sized preview to a destination location; and     paste, in response to a second click, the copied image object at the destination location with a size determined from the re-sized preview.

\* \* \* \* \*